(12) United States Patent
Zhang et al.

(10) Patent No.: US 12,416,958 B2
(45) Date of Patent: Sep. 16, 2025

(54) TERMINAL DEVICE AND CHARGING METHOD

(71) Applicant: Honor Device Co., Ltd., Shenzhen (CN)

(72) Inventors: Youjun Zhang, Shenzhen (CN); Yulei Wen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/272,895

(22) PCT Filed: Dec. 26, 2022

(86) PCT No.: PCT/CN2022/142070
§ 371 (c)(1),
(2) Date: Jul. 18, 2023

(87) PCT Pub. No.: WO2023/185143
PCT Pub. Date: Oct. 5, 2023

(65) Prior Publication Data
US 2024/0393853 A1    Nov. 28, 2024

(30) Foreign Application Priority Data

Apr. 1, 2022  (CN) .......................... 202210355213.0

(51) Int. Cl.
*G06F 1/26* (2006.01)
*G06F 1/16* (2006.01)
(Continued)

(52) U.S. Cl.
CPC ............ *G06F 1/266* (2013.01); *G06F 1/1626* (2013.01); *G06F 1/1669* (2013.01);
(Continued)

(58) Field of Classification Search
CPC ...... G06F 1/266; G06F 1/1626; G06F 1/1669; G06F 1/1683; G06F 1/263;
(Continued)

(56) References Cited

U.S. PATENT DOCUMENTS 7,612,767 B1 * 11/2009 Griffin .................. G06F 3/0442
                                                                178/19.03
11,042,231 B2 * 6/2021 Yang .................... G06F 3/03545
(Continued)

FOREIGN PATENT DOCUMENTS

| CN | 202171780 U | 3/2012 |
| CN | 110943501 A | 3/2020 |

(Continued)

*Primary Examiner* — Aurel Prifti
(74) *Attorney, Agent, or Firm* — Slater Matsil, LLP

(57) ABSTRACT

A terminal device includes: a tablet and a keyboard. The tablet includes: a first controller, a first charging port, and a battery. The keyboard includes: a second controller and a second charging port; and the keyboard includes no battery. The first controller communicates with the second controller through data lines in 3pin. When the first charging port is connected to a first external power supply, and the second charging port is connected to a second external power supply, when a charging power of the first charging port is greater than a charging power of the second charging port, the first charging port is selected to charge the tablet and power is supplied to the keyboard through a power line in the 3pin; otherwise, the second charging port is selected to supply power to the keyboard and the tablet is charged through a power line in the 3pin.

20 Claims, 4 Drawing Sheets

(51) Int. Cl.
  *G06F 3/0354* (2013.01)
  *H02J 7/00* (2006.01)
  *H02J 50/10* (2016.01)

(52) U.S. Cl.
  CPC ............ *G06F 1/1683* (2013.01); *G06F 1/263* (2013.01); *G06F 3/03545* (2013.01); *H02J 7/0068* (2013.01); *H02J 50/10* (2016.02); *G06F 2200/1632* (2013.01)

(58) Field of Classification Search
  CPC .......... G06F 3/03545; G06F 2200/1632; H02J 50/10; H02J 7/0068
  See application file for complete search history.

(56) References Cited

U.S. PATENT DOCUMENTS

| | | | | |
|---|---|---|---|---|
| 11,095,463 | B2* | 8/2021 | Pelissier | H04L 12/10 |
| 11,150,749 | B2* | 10/2021 | Keidar | G06F 3/03545 |
| 11,342,785 | B2* | 5/2022 | Maeda | H02J 1/084 |
| 11,469,603 | B1* | 10/2022 | McKittrick | G06F 3/0202 |
| 11,847,269 | B2* | 12/2023 | Lee | G06F 3/03547 |
| 2005/0189922 | A1 | 9/2005 | Maskatia et al. | |
| 2010/0064153 | A1* | 3/2010 | Gk | G06F 1/266 710/313 |
| 2013/0290764 | A1* | 10/2013 | Taki | G06F 1/266 713/340 |
| 2016/0126757 | A1* | 5/2016 | Hirosawa | G06F 3/0231 307/20 |
| 2017/0161221 | A1* | 6/2017 | Yakame | G06F 1/189 |
| 2017/0264122 | A1* | 9/2017 | Greening | H02J 7/00 |
| 2018/0101272 | A1* | 4/2018 | Xi | G06F 3/042 |
| 2018/0267586 | A1* | 9/2018 | Jung | G06F 1/263 |
| 2019/0074708 | A1* | 3/2019 | Krishnakumar | H02J 7/0013 |
| 2019/0312459 | A1* | 10/2019 | Garbus | H02J 7/00034 |
| 2020/0006952 | A1* | 1/2020 | Jang | H02J 7/00712 |
| 2020/0144867 | A1* | 5/2020 | Sultenfuss | H02J 50/10 |
| 2020/0150720 | A1 | 5/2020 | Wang | |
| 2020/0161872 | A1* | 5/2020 | Files | H02J 7/0068 |
| 2020/0161907 | A1* | 5/2020 | Yang | H02J 7/02 |
| 2020/0274404 | A1* | 8/2020 | Sankar | H02J 7/00034 |
| 2020/0348723 | A1* | 11/2020 | Wood, III | G06F 13/385 |
| 2020/0403426 | A1* | 12/2020 | Chen | H02J 7/0068 |
| 2021/0135088 | A1* | 5/2021 | Bikumala | H02N 2/181 |
| 2021/0232193 | A1* | 7/2021 | Sultenfuss | H02J 7/0045 |
| 2021/0232196 | A1* | 7/2021 | Sultenfuss | H02J 7/02 |
| 2022/0179213 | A1* | 6/2022 | Zhou | H02J 50/10 |
| 2023/0120816 | A1* | 4/2023 | Chen | H02J 50/80 320/108 |
| 2023/0195244 | A1 | 6/2023 | Xi et al. | |
| 2023/0229244 | A1 | 7/2023 | Wu et al. | |

FOREIGN PATENT DOCUMENTS

| | | |
|---|---|---|
| CN | 111045488 A | 4/2020 |
| CN | 112698733 A | 4/2021 |
| CN | 113220144 A | 8/2021 |
| CN | 113253855 A | 8/2021 |
| CN | 114243871 A | 3/2022 |

\* cited by examiner

TERMINAL DEVICE AND CHARGING METHOD

CROSS-REFERENCE TO RELATED APPLICATIONS

This application is a national stage of International Application No. PCT/CN2022/142070, filed on Dec. 26, 2022, which claims priority to Chinese Patent Application No. 202210355213.0, filed on Apr. 1, 2022. The disclosures of both of the aforementioned applications are hereby incorporated by reference in their entireties.

TECHNICAL FIELD

This application relates to the field of terminal technologies, and in particular, to a terminal device and a charging method.

BACKGROUND

A tablet computer, also referred to as a portable computer (Tablet Personal Computer, Tablet PC), is a computer that is small in size and easy to carry. For ease of use, currently, a tablet computer serving as a host may be externally connected to a keyboard, that is, the tablet computer may be manipulated through the keyboard.

The tablet computer and the keyboard may be connected to each other through a pogo pin, the pogo pin includes a form such as 3pin, 4pin or 5pin, and currently the form of 3pin is applied most widely. 3pin mainly includes a power supply pin for supplying power, a data pin, and a ground GND pin. In addition to transmitting data of a touchpad, data of the keyboard, data of a charging protocol, and other data, the data pin may further implement detection between the tablet computer and the keyboard.

Currently, each keyboard is equipped with a battery, and the battery of the keyboard is charged or power is supplied to the keyboard through a tablet. In this way, of the keyboard is high in costs and large in volume. Because of existence of the battery of the keyboard, the keyboard cannot be made very thin, and portability of the keyboard is affected.

SUMMARY

To resolve the foregoing problem, this application provides a terminal device and a charging method, to implement a keyboard without a battery, thereby helping implement lightening and thinning for the keyboard and helping implement quick charging.

According to a first aspect, this application provides a terminal device, including: a tablet and a keyboard, where
the tablet includes: a first controller, a first charging port, and a battery;
the keyboard includes: a second controller and a second charging port; and the keyboard includes no battery;
the first controller communicates with the second controller through data lines in 3pin; and
when the first charging port is connected to a first external power supply, and the second charging port is connected to a second external power supply, in a case that a charging power of the first charging port is greater than a charging power of the second charging port, the first charging port is selected to charge the tablet and power is supplied to the keyboard through a power line in the 3pin; otherwise, the second charging port is selected to supply power to the keyboard and the tablet is charged through a power line in the 3pin.

In a possible implementation, the keyboard is equipped with a storage portion of a stylus, and when the stylus is stored in the storage portion and the keyboard is not connected to the tablet, the keyboard wirelessly charges the stylus by using the second external power supply.

In a possible implementation, when the second charging port of the keyboard is connected to the second external power supply and the keyboard is not connected to the tablet, neither the power line in the 3pin of the keyboard nor the power line in the 3pin of the tablet is electrified.

In a possible implementation, after the second controller determines that the keyboard is connected to the tablet, and receives a power supply instruction sent by the first controller, the second controller controls the power line in the 3pin of the keyboard to output a voltage.

In a possible implementation, when the keyboard is connected to the tablet, and the second charging port of the keyboard is unplugged from the second external power supply, the tablet is configured to continuously supply power to the keyboard.

In a possible implementation, the tablet includes: a low-dropout linear regulator and a diode; and
a power output end of the low-dropout linear regulator is connected to an anode of the diode, and a cathode of the diode is connected to the power line in the 3pin of the tablet; and an input end of the low-dropout linear regulator is connected to a system power supply of the tablet.

In a possible implementation, the low-dropout linear regulator includes an enabling pin; and
the first controller is configured to: when receiving power failure information sent by the second controller, send an enabling signal to the enabling pin, and the power output end of the low-dropout linear regulator outputs a voltage.

In a possible implementation, when the second charging port of the keyboard is connected to the second external power supply, the tablet is first disconnected from and then connected to the keyboard, and the second controller of the keyboard is configured to perform handshake communication with the first controller of the tablet; and the first controller is configured to recognize that the keyboard is connected to the tablet.

In a possible implementation, the keyboard includes: a charging switch; and
a first end of the charging switch is connected to a power supply pin of the second charging port of the keyboard; a second end of the charging switch is connected to the power line in the 3pin of the keyboard; and
the second controller of the keyboard is further configured to: determine that the second charging port is connected to the second external power supply; and control, when the tablet is connected to the keyboard and the first charging port of the tablet is not connected to the first external power supply, the charging switch to close, and the keyboard charges the battery of the tablet by using the second external power supply.

In a possible implementation, the tablet is further configured to supply power to an external device connected to the tablet.

In a possible implementation, the keyboard further includes: a buckboost circuit and a wireless charging chip;
an input end of the buckboost circuit is configured to connect to a power supply pin of the second charging port;

an output end of the buckboost circuit is connected to an input end of the wireless charging chip; and an output end of the wireless charging chip is configured to charge the stylus.

This application further provides a charging method for a terminal device. The terminal device includes: a tablet and a keyboard, where the tablet includes: a first controller, a first charging port, and a battery; the keyboard includes: a second controller and a second charging port; and the keyboard includes no battery; the first controller communicates with the second controller through data lines in 3pin; and the charging method includes:
when the first charging port is connected to a first external power supply, and the second charging port is connected to a second external power supply, comparing a charging power of the first charging port with a charging power of the second charging port;

in a case that the charging power of the first charging port is greater than the charging power of the second charging port, selecting the first charging port to charge the tablet and supplying power to the keyboard through a power line in the 3pin; and in a case that the charging power of the first charging port is less than the charging power of the second charging port, selecting the second charging port to supply power to the keyboard and charging the tablet through a power line in the 3pin.

This application has at least the following advantages:

The terminal device provided in embodiments of this application includes: a tablet and a keyboard, where the tablet includes: a first controller, a first charging port, and a battery; the keyboard includes: a second controller and a second charging port; and the keyboard includes no battery; and the first controller communicates with the second controller through data lines in 3pin. Because the keyboard includes no battery, the volume and the weight of the keyboard are reduced, and lightening and thinning are implemented for the keyboard. In addition, a case that the keyboard includes no battery does not affect the keyboard in charging the stylus since the keyboard includes the second charging port such as a Type-C port that can be externally connected to a charger in a wired manner to charge the stylus while supplying power to the keyboard. In addition, when the keyboard is connected to the tablet, the keyboard may alternatively charge the tablet through an external charger. In addition, in the terminal device provided in this application, a side of the keyboard includes a wired charging port, a side of the tablet also includes a wired charging port, and when the side of the keyboard and the side of the tablet are each connected to a wired charger, a side whose charging power is larger is selected to perform charging. Such a charging speed is high, and fast full charging can be implemented. For example, when the charging power of the side of the keyboard is larger, the side of the keyboard is selected, and the wired charging port of the side of the tablet receives no external power. When the charging power of the side of the tablet is larger, the side of the tablet is selected to perform charging, and the wired charging port of the side of the keyboard receives no external power.

DETAILED DESCRIPTION OF ILLUSTRATIVE EMBODIMENTS

To make a person skilled in the art more clearly understand solutions of this application, an application scenario of the technical solutions of this application is first described below.

Figure 1:
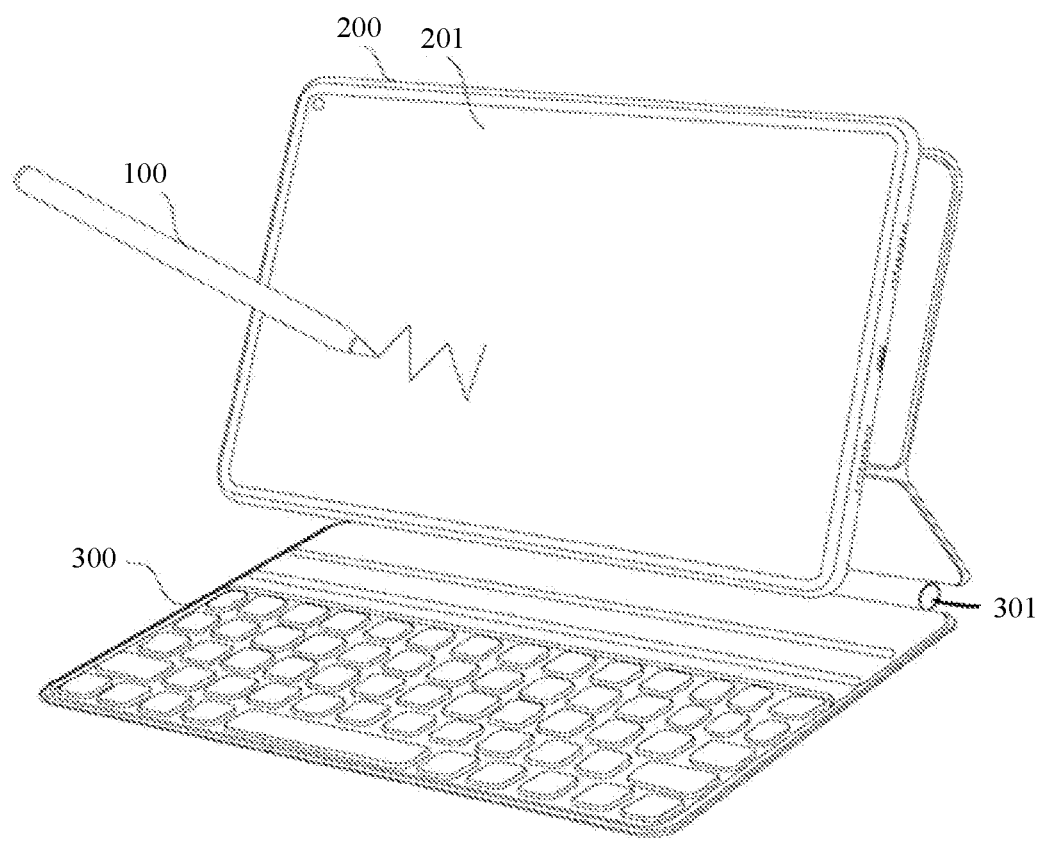
FIG. 1 is a schematic diagram of a terminal device according to an embodiment of this application.

FIG. 1 is a schematic diagram of a terminal device according to an embodiment of this application.

The terminal device provided in this application includes: a tablet 200, a keyboard 300, and a stylus 100. The keyboard 300 includes a stylus storage portion 301, and the stylus 100 may be inserted into the stylus storage portion 301 and be wirelessly charged.

The tablet 200 includes a touch screen. The stylus 100 may input information on the touch screen 201, and the touch screen 201 may sense the information inputted by the stylus 100 and respond.

The stylus 100 and the keyboard 300 may each input information to the tablet. A touch region may be arranged on the keyboard 300, and the stylus 100 may operate the touch region on the keyboard 300.

A wired connection is used between the keyboard 300 and the tablet 200, and includes a data communication connection and a power supply connection. The keyboard 300 and the tablet 200 are connected to each other directly through 3pin. The 3pin includes a data line, namely, a Data pin, a GND pin, and a power line, namely, a VBUS pin. The keyboard 300 and the tablet 200 communicate with each other through a one-line serial port of the Data pin.

Because a stylus is located on the top of a conventional tablet, the tablet charges the stylus. For more aesthetics, currently the stylus is stored in the storage portion of the keyboard, is hidden, and is not prone to fall off. However, the keyboard storing the stylus needs to charge the stylus. If the keyboard is equipped with a battery, the costs are high, and the volume is large. In addition, the large weight is not conducive to lightening and thinning of the keyboard. Therefore, to reduce the costs and make the keyboard lighter and thinner, in the terminal device provided in this application, only the tablet includes a battery, but the keyboard includes no battery Specific implementations of terminal devices provided in this application are introduced below with reference to accompanying drawings.

Terminal Device Embodiment

Figure 2:
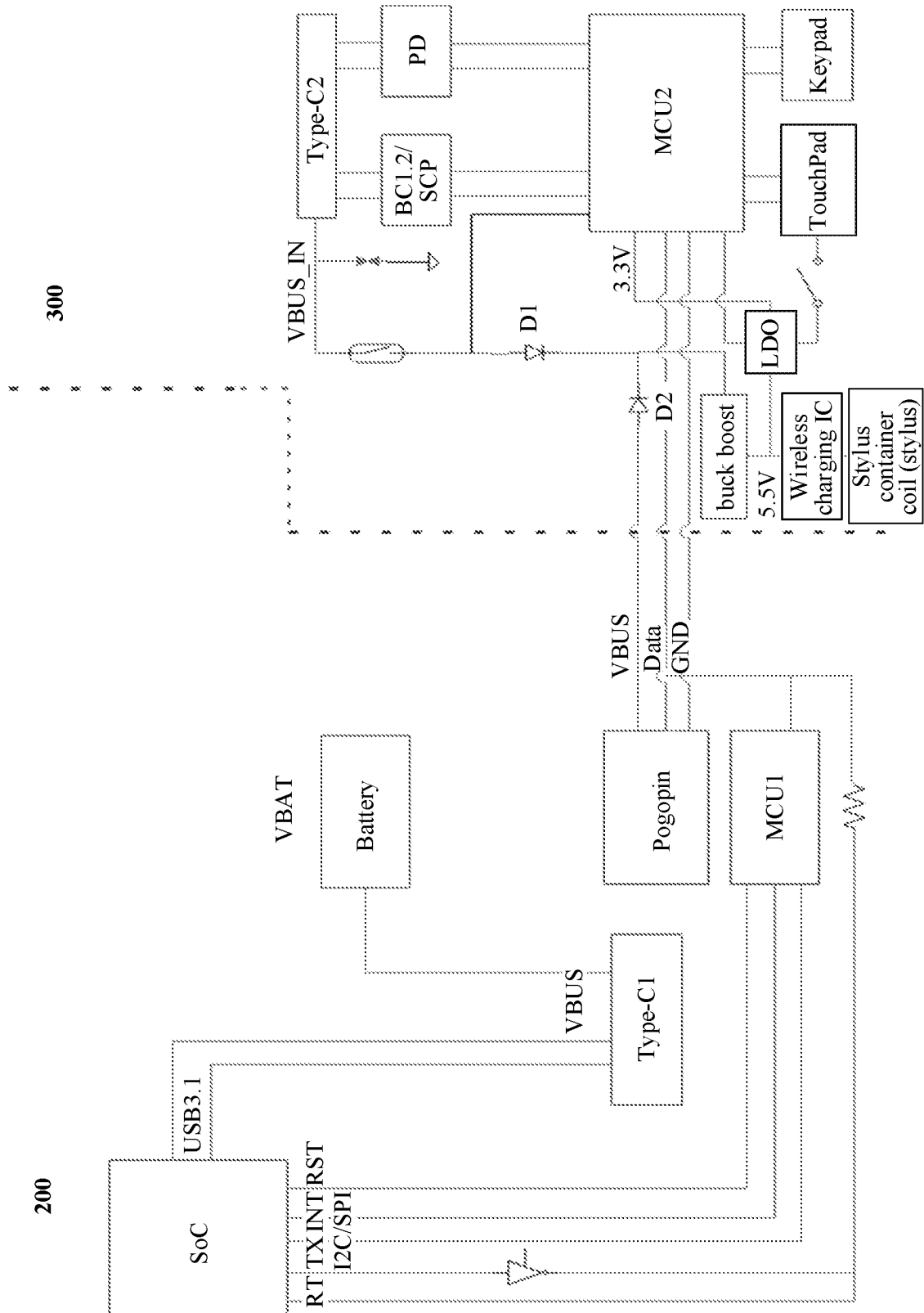
FIG. 2 is a diagram of an internal architecture of another terminal device according to an embodiment of the present application.

FIG. 2 is a diagram of an internal architecture of another terminal device according to an embodiment of the present application.

The terminal device provided in this application includes: a tablet 200 and a keyboard 300.

The tablet 200 includes: a first controller MCU1 (using a microcontroller unit MCU as an example), a first charging port Type-C1 (using a typeC port as an example), and a battery VBAT.

The keyboard 300 includes: a second controller MCU2 (using a microcontroller unit MCU as an example) and a second charging port Type-C2 (using a typeC port as an example). The keyboard 300 includes no battery.

The keyboard provided in this embodiment of this application includes an independent controller, and the controller may complete charging control on the side of the keyboard, and implement communication control and charging control on the side of the tablet. Additionally, the controller may further respond to input information of a Keypad of the keyboard and respond to input information of a touch area TouchPad of the keyboard.

The first controller MCU1 communicates with the second controller MCU2 through data lines Data in 3pin.

When the first charging port Type-C1 is connected to a first external power supply, and the second charging port Type-C2 is connected to a second external power supply, in a case that a charging power of the first charging port Type-C1 is greater than a charging power of the second charging port Type-C2, the first charging port Type-C1 is selected to charge the tablet 200 and power is supplied to the keyboard 300 through a power line in the 3pin; otherwise, the second charging port Type-C2 is selected to supply power to the keyboard 300 and the tablet 200 is charged through a power line in the 3pin. That is, in the terminal device provided in this embodiment of this application, when the side of the keyboard and the side of the tablet are each connected to an external power supply, a side whose charging power is larger is selected to perform charging and supply power. In this way, charging efficiency can be improved, and full charging can be completed fast in a short time.

In this embodiment of this application, the second controller MCU2 of the side of the keyboard performs charging communication with the second charging port Type-C2 through the BC1.2 protocol.

The keyboard further includes: a buckboost circuit and a wireless charging chip IC;
  an input end of the buckboost circuit is configured to connect to a power supply pin of the second charging port;
  an output end of the buckboost circuit is connected to an input end of the wireless charging IC; and
  when the second charging port Type-C2 is connected to an external charger, a power supply pin VBUS_IN of the second charging port Type-C2 is electrified, to supply power to the buckboost circuit through a first diode D1.

In this embodiment of this application, the output voltage of the buckboost circuit is not specifically limited, and may be, for example, 5.5 V in some cases.

The output end of the wireless charging IC is used for charging the stylus. Because the stylus is wirelessly charged, a transmitting coil for wireless charging is located in the stylus storage portion, that is, a stylus container, and the wireless charging IC supplies power to the transmitting coil, and a receiving coil is located in the stylus.

In the terminal device provided in this embodiment of this application, because the keyboard includes no battery, the volume and the weight of the keyboard are reduced, and lightening and thinning are implemented for the keyboard. In addition, a case that the keyboard includes no battery does not affect the keyboard in charging the stylus since the keyboard includes the second charging port such as a Type-C port that can be externally connected to a charger in a wired manner to charge the stylus while supplying power to the keyboard. In addition, when the keyboard is connected to the tablet, the keyboard may alternatively charge the tablet through an external charger. In addition, in the terminal device provided in this application, a side of the keyboard includes a wired charging port, a side of the tablet also includes a wired charging port, and when the side of the keyboard and the side of the tablet are each connected to a wired charger, a side whose charging power is larger is selected to perform charging. Such a charging speed is high, and fast full charging can be implemented. For example, when the charging power of the side of the keyboard is larger, the side of the keyboard is selected, and the wired charging port of the side of the tablet receives no external power. When the charging power of the side of the tablet is larger, the side of the tablet is selected to perform charging, and the wired charging port of the side of the keyboard receives no external power.

Several working modes of terminal device provided in this embodiment of this application are listed below.

First working mode: The second charging port Type-C2 of the keyboard is connected to an external charger, the first charging port Type-C1 of the tablet is not connected to any external charger, and the keyboard charges the battery of the tablet through the external charger. Meanwhile, if the first charging port Type-C1 of the tablet is plugged with an OTG external device such as a USB flash drive, the tablet may further supply power to the external device.

Second working mode: The keyboard includes no battery, the second charging port Type-C2 of the keyboard is not connected to any external charger, and the tablet supplies power to the keyboard through the power line in the 3pin and also charges the stylus when the stylus is located in the storage portion. The keyboard is equipped with a storage portion of a stylus, and when the stylus is stored in the storage portion and the keyboard is not connected to the tablet, the keyboard wirelessly charges the stylus by using the second external power supply.

Third working mode: The second charging port Type-C2 of the keyboard is connected to an external charger, the keyboard is equipped with a stylus storage portion, the keyboard is not connected to the tablet, and the keyboard wirelessly charges the stylus through the external charger. In this way, charging efficiency can be improved.

Only several typical working modes are listed above. Additionally, because the keyboard and the tablet are each equipped with a wired charging port, charging is free. Other power supplying and charging manners are not described herein one by one. In addition, wired communication and wired power supply are implemented between the keyboard and the tablet. Therefore, compared with wireless communication and wireless charging, communication efficiency and charging efficiency are both improved and reliability is higher.

Additionally, to reduce electric corrosion of the power supply port in the 3pin, when the second charging port of the keyboard is connected to the second external power supply and the keyboard is not connected to the tablet, neither the power line in the 3pin of the keyboard nor the power line in the 3pin of the tablet is electrified. If the power line in the 3pin of the tablet is electrified regardless of whether the tablet and the keyboard are connected to each other, the power supply port in the 3pin of the tablet is prone to encounter electrochemical corrosion, and an undesired electrical connection is easily caused after a long time. Additionally, when the keyboard is not connected to the tablet, and the keyboard is connected to the second external power supply, the power supply port in the 3pin of the keyboard is also configured to be not electrified. In this way, electrochemical corrosion of the power supply port in the 3pin of the keyboard can be reduced.

Specifically, in an implementation, only when it is confirmed that the keyboard is connected to the tablet, the keyboard is connected to an external power supply, and the tablet allows the keyboard to supply power to the tablet, the power line in the 3pin of the keyboard is electrified. To be specific, after the second controller determines that the keyboard is connected to the tablet, and receives a power supply instruction sent by the first controller, the second controller controls the power line in the 3pin of the keyboard to output a voltage. In the terminal device provided in this embodiment of this application, the power lines in the 3pin of the keyboard and the tablet are electrified only when power needs to be supplied, and are not electrified if power does not need to be supplied. In this way, ports of the power lines can be protected from corrosion, and service life can be prolonged.

To implement continuous power supplying of the keyboard, in the terminal device provided in this embodiment of this application, the tablet may continuously supply power to the keyboard, that is, when the keyboard is connected to the tablet, and the second charging port of the keyboard is unplugged from the second external power supply, the tablet is used for continuously supplying power to the keyboard. When the second charging port of the keyboard is connected to the second external power supply, the second external power supply is preferentially used to supply power to the keyboard. However, when the second external power supply is unplugged, since a power failure should not occur in the keyboard, the tablet may perform seamless switching to supply power to the keyboard. A specific implementation is introduced below.

Figure 3:
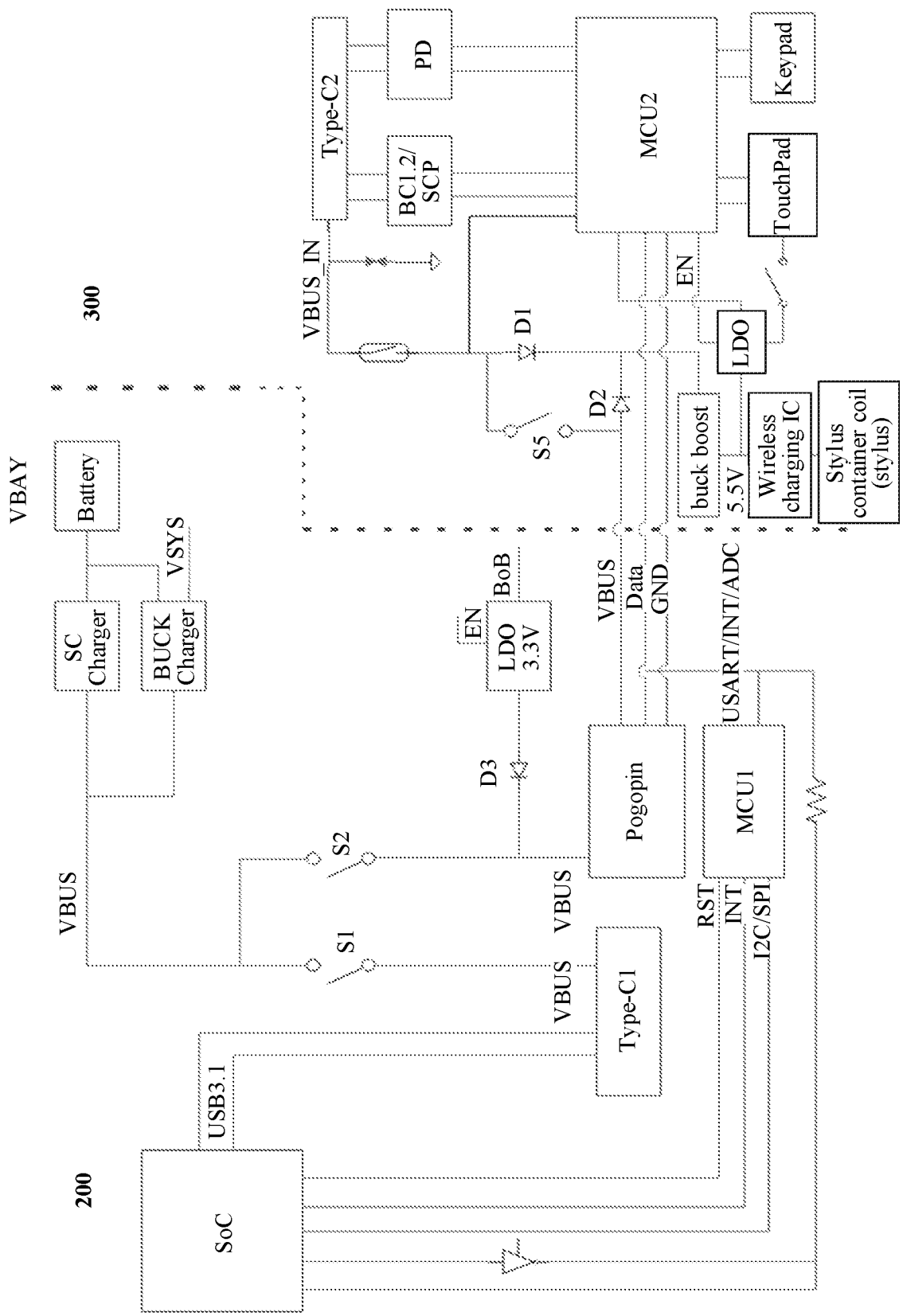
FIG. 3 is a diagram of an internal architecture of still another terminal device according to an embodiment of the present application.

FIG. 3 is a schematic diagram of still another terminal device according to an embodiment of this application.

A tablet provided in this embodiment includes: a low-dropout linear regulator (LDO) and a diode D3.

For example, an output voltage of the low-dropout linear regulator (LDO) may be a voltage matching VBUS, for example, 3.3 V.

A power output end of the low-dropout linear regulator (LDO) is connected to an anode of the diode D3, and a cathode of the diode D3 is connected to the power line in the 3pin of the tablet 200; and an input end of the low-dropout linear regulator (LDO) is connected to a system power supply of the tablet 200.

As can be seen from FIG. 3, because the input end BoB of the low-dropout linear regulator (LDO) is always being electrified, BoB comes from the system power supply VSYS. According to a unidirectional switching-on characteristic of the diode D3, when the 3pin, that is, VBUS of Pogopin is at a low potential, the low-dropout linear regulator (LDO) outputs a voltage to VBUS through the diode D3, that is, supplies power to the side of the keyboard through a diode D2 on the side of the keyboard 300, and may charge a stylus if the stylus is located in a stylus container on the side of the keyboard.

In the tablet in the terminal device provided in this embodiment of this application, because the low-dropout linear regulator (LDO) dedicated to supplying power to VBUS is arranged, power may be supplied to VBUS at any time. When a power failure occurs in the keyboard, the side of the tablet may supply power to the keyboard in time, to continuously supply power to the keyboard.

Additionally, in a possible implementation, the low-dropout linear regulator (LDO) may include an enabling pin EN; and the first controller MCU1 is configured to: when receiving power failure information sent by the second controller MCU2, send an enabling signal to the enabling pin EN of the low-dropout linear regulator (LDO), that is, enable the low-dropout linear regulator (LDO) to begin working, and the power output end of the low-dropout linear regulator (LDO) outputs a voltage.

It should be understood that, the low-dropout linear regulator (LDO) may alternatively not include any enabling pin EN, and the low-dropout linear regulator (LDO) is always outputting a voltage. When including an enabling pin EN, the low-dropout linear regulator (LDO) outputs a voltage only when power needs to be supplied. In this way, energy can be saved, and power consumption can be reduced.

Additionally, in the terminal device provided in this embodiment of this application, in addition to the first controller MCU1, the tablet 200 further includes a system-on-a-chip SoC. Between the system-on-a-chip SoC and the first controller MCU1, communication, for example, serial communication such as I2C or SPI is performed. Additionally, between the two, an interrupt port INT may be further included, and a reset port RST is further included.

Data communication between the system-on-a-chip SoC and the first controller MCU1 may be bidirectional communication, that is, includes both a transmission channel TX and a receiving channel RX.

The system-on-a-chip SoC may serve as a host computer of the first controller MCU1, to control the first controller MCU1. Additionally, the system-on-a-chip SoC also controls the first charging port Type-C1.

The serial communication manner between MCU1 and MCU2 may be UART. Because only one-line communication is performed between MCU1 and MCU2, the data line may further implement an interrupt INT function, and may further implement a signal sampling function, for example, perform analog-to-digital conversion ADC on a sampled signal.

In the terminal device provided in this embodiment of this application, the second charging port Type-C2 of the keyboard 300 is connected to an external charger, the tablet 200 may be taken away from and placed on the keyboard 300 at any time, and a case that the keyboard 300 cannot be recognized when the tablet 200 is taken away from and then placed on the keyboard 300 will not occur.

When the second charging port Type-C2 of the keyboard 300 is connected to the second external power supply, the tablet 200 is first disconnected from and then connected to the keyboard 300, and the second controller MCU2 of the keyboard 300 is configured to perform handshake communication with the first controller MCU1 of the tablet 200; and the first controller MCU1 is configured to recognize that the keyboard 300 is connected to the tablet 200. For example, recognition is performed once again between the tablet 200 and the keyboard 300, for example, a heartbeat signal may be sent. If there is a response within a preset time period, it indicates connection, and the tablet resumes connection. If there is no response beyond the preset time period, it indicates disconnection, and the tablet 200 resumes disconnection.

When the side of the tablet is electrified, the side of the keyboard does not need to supply power to the side of the tablet. Only when the side of the tablet is not connected to any power supply, the side of the keyboard needs to supply power to the tablet. Circuit implementations of supplying power to the side of the tablet by the side of the keyboard provided in this application are introduced below with reference to accompanying drawings.

Still referring to FIG. 3, the keyboard 300 includes: a charging switch S5.

A first end of the charging switch S5 is connected to a power supply pin of the second charging port Type-C2 of the keyboard. A second end of the charging switch S5 is connected to the power line in the 3pin of the keyboard 300.

The second controller MCU2 of the keyboard 300 is further configured to: determine that the second charging port Type-C2 is connected to the second external power supply; and MCU2 controls, when the tablet 200 is connected to the keyboard 300 and the first charging port Type-C1 of the tablet 200 is not connected to the first external power supply, the charging switch S5 to close, and the keyboard 300 charges the battery VBAT of the tablet 200 by using the second external power supply.

When the tablet does not need to be supplied with power by the side of the keyboard, MCU2 controls S5 to open. When the side of the tablet is not connected to any power supply, in a case that the tablet is connected to the keyboard and the keyboard is connected to an external power supply, MCU2 controls S5 to close, thereby supplying power to VBUS of the tablet.

Additionally, in the terminal device provided in this embodiment of this application, the tablet 200 further includes: a first switch S1 and a second switch S2.

A first end of the first switch S1 is connected to the first charging port Type-C1, and a second end of the first switch S1 is connected to an SC Charger, that is, a switched-capacitor charger for charging the battery VBAT, and is also connected to a BUCK Charger. In addition to the SC Charger, the tablet provided in this embodiment of this application further includes the BUCK Charger. That is, the SC Charger may fast charge the battery, and the BUCK Charger may slowly charge the battery.

When the first charging port Type-C1 of the tablet is not connected to any external power supply, MCU1 controls S1 to open.

A first end of the second switch S2 is connected to the power line in the 3pin of the side of the tablet, that is, VBUS in Pogopin of the tablet in FIG. 3, and a second end of the second switch S2 is connected to the SC Charger for charging the battery VBAT, and is also connected to the BUCK Charger.

In addition, when the first charging port Type-C1 of the tablet is not connected to any external power supply, the second charging port Type-C2 of the keyboard 300 is connected to an external power supply, and the tablet is connected to the keyboard, the keyboard supplies power to and charges the tablet. In this case, the second switch S2 needs to be controlled to close, that is, VBUS of the side of the keyboard supplies power to VBUS of the side of the tablet, and Pogopin of the tablet charges the battery VBAT through the second switch S2.

Additionally, in the terminal device provided in this embodiment of this application, the side of the keyboard 300 further includes a first diode D1 and a second diode D2, an anode of the first diode D1 is connected to a voltage output end of the second charging port Type-C2, and a cathode of the first diode D1 is connected to an input end of a buckboost circuit.

An anode of the second diode D2 is connected to VBUS in the 3pin, and a cathode of the second diode D2 is connected to the cathode of the first diode D1.

Additionally, the side of the keyboard 300 further includes a low-dropout linear regulator (LDO), and the LDO on the side of the keyboard 300 is configured to convert 5.5 V outputted by the buckboost circuit into stable 3.3 V to supply power to the second controller MCU2.

Method Embodiment

Based on a terminal device provided in the foregoing embodiments, the embodiments of this application further provide a charging method for a terminal device. The method is described in detail below with reference to the accompanying drawings.

Figure 4:
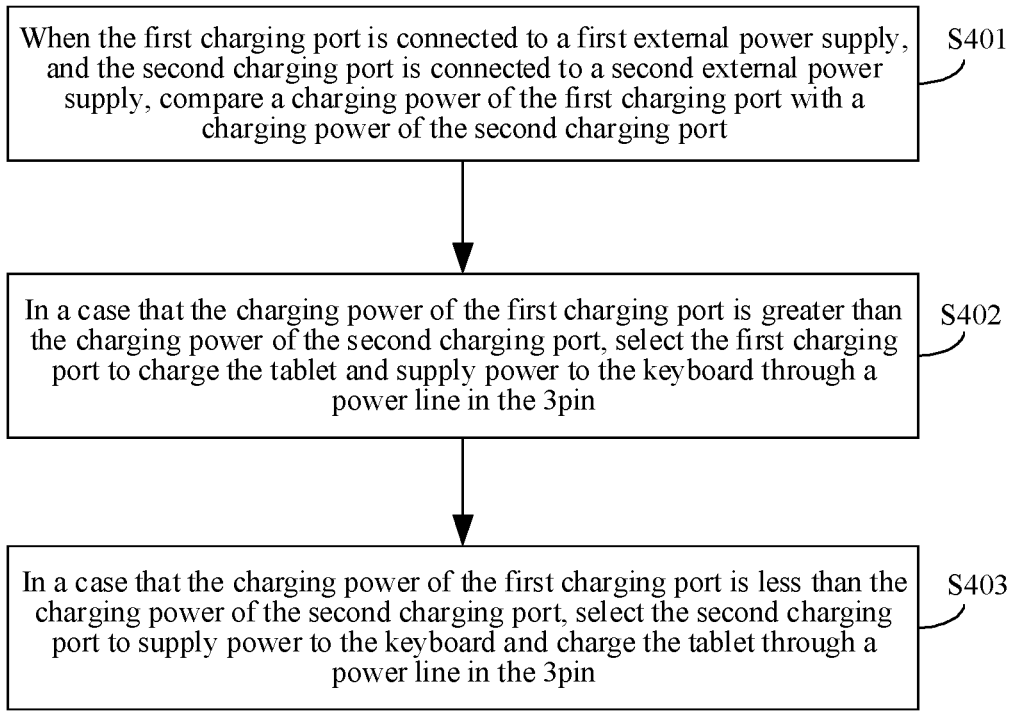
FIG. 4 is a flowchart of a charging method for a terminal device according to an embodiment of this application.

FIG. 4 is a flowchart of a charging method for a terminal device according to an embodiment of this application.

In the charging method for a terminal device provided in this embodiment, the terminal device includes: a tablet and a keyboard, where the tablet includes: a first controller, a first charging port, and a battery; the keyboard includes: a second controller and a second charging port; and the keyboard includes no battery; and the first controller communicates with the second controller through data lines in 3pin.

The charging method includes:

S401: When the first charging port is connected to a first external power supply, and the second charging port is connected to a second external power supply, compare a charging power of the first charging port with a charging power of the second charging port.

S402: In a case that the charging power of the first charging port is greater than the charging power of the second charging port, select the first charging port to charge the tablet and supply power to the keyboard through a power line in the 3pin.

S403: In a case that the charging power of the first charging port is less than the charging power of the second charging port, select the second charging port to supply power to the keyboard and charge the tablet through a power line in the 3pin.

That is, in the terminal device provided in this embodiment of this application, when the side of the keyboard and the side of the tablet are each connected to an external power supply, a side whose charging power is larger is selected to perform charging and supply power. In this way, charging efficiency can be improved, and full charging can be completed fast in a short time.

Based on the charging method provided in this embodiment of this application, in the terminal device provided in this application, a side of the keyboard includes a wired charging port, a side of the tablet also includes a wired charging port, and when the side of the keyboard and the side of the tablet are each connected to a wired charger, a side whose charging power is larger is selected to perform charging. Such a charging speed is high, and fast full charging can be implemented. For example, when the charging power of the side of the keyboard is larger, the side of the keyboard is selected, and the wired charging port of the side of the tablet receives no external power. When the charging power of the side of the tablet is larger, the side of the tablet is selected to perform charging, and the wired charging port of the side of the keyboard receives no external power.

It should be understood that in this application, "at least one (item)" refers to one or more and "a plurality of" refers to two or more. The term "and/or" describes an association between associated objects and represents that three associations may exist. For example, "A and/or B" may indicate that only A exists, only B exists, and both A and B exist, where A and B may be singular or plural. The character "/" in this specification generally indicates an "or" relationship between the associated objects. "At least one of the following" or a similar expression thereof indicates any combination of the following, and includes any combination of one or more of the following. For example, at least one of a, b, or c may represent a, b, c, "a and b", "a and c", "b and c", or "a, b, and c", where a, b, and c may be singular or plural.

As discussed above, the foregoing embodiments are merely intended for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of this application.

What is claimed is:

1. A terminal device, comprising: a tablet and a keyboard, wherein:
   the tablet comprises:
      a first controller;
      a first charging port; and
      a switch cap (SC) Charger;
      a first switch, wherein a first end of the first switch is connected to the first charging port and a second end of the first switch is connected to the SC Charger;
      a second switch, wherein a first end of the second switch is connected to a power line in a 3pin of the tablet and a second end of the second switch is connected to the SC Charger;
      a battery;
      a low-dropout linear regulator; and
      a diode, wherein a power output end of the low-dropout linear regulator is connected to an anode of the diode, and a cathode of the diode is connected to the power line in the 3pin of the tablet, and an input end of the low-dropout linear regulator is connected to a system power supply of the tablet;
   the keyboard comprises:
      a second controller;
      a second charging port; and
      a charging switch;
   wherein a first end of the charging switch is connected to a power supply pin of the second charging port of the keyboard, and a second end of the charging switch is connected to a power line in a 3pin of the keyboard;
   the first controller communicates with the second controller through data lines in the 3pin of the tablet and the 3pin of the keyboard; and
   the first controller and the second controller are configured to select a manner of charging the tablet by:
      when the first charging port is connected to a first external power supply, and the second charging port is connected to a second external power supply, in a case that a charging power of the first charging port is greater than a charging power of the second charging port, the first charging port is selected to charge the tablet and power is supplied to the keyboard through the power line in the 3pin of the keyboard; and
      in a case that the charging power of the first charging port is less than the charging power of the second charging port, the second charging port is selected to supply power to the keyboard and the tablet is charged through the power line in the 3pin of the tablet.

2. The terminal device according to claim 1, wherein the keyboard further comprises:
   a storage portion of a stylus;
   a buckboost circuit; and
   a wireless charging chip integrated circuit (IC), wherein an input end of the buckboost circuit is configured to connect to the power supply pin of the second charging port, an output end of the buckboost circuit is connected to an input end of the wireless charging IC; and
   the keyboard is configured to, when the stylus is stored in the storage portion and the keyboard is not connected to the tablet, wirelessly charge the stylus by using the second external power supply.

3. The terminal device according to claim 1, wherein when the second charging port of the keyboard is connected to the second external power supply and the keyboard is not connected to the tablet, neither the power line in the 3pin of the keyboard nor the power line in the 3pin of the tablet is electrified.

4. The terminal device according to claim 1, wherein the second controller is configured to:
   after the second controller determines that the keyboard is connected to the tablet, and receives a power supply instruction sent by the first controller, control the power line in the 3pin of the keyboard to output a voltage.

5. The terminal device according to claim 1, wherein the tablet is configured to:
   when the keyboard is connected to the tablet, and the second charging port of the keyboard is unplugged from the second external power supply, continuously supply power to the keyboard.

6. The terminal device according to claim 1, wherein the low-dropout linear regulator comprises an enabling pin; and
   the first controller is configured to: when receiving power failure information sent by the second controller, send an enabling signal to the enabling pin, wherein the power output end of the low-dropout linear regulator outputs a voltage.

7. The terminal device according to claim 1, wherein the tablet is configured in a manner that:
   when the second charging port of the keyboard is connected to the second external power supply, and the tablet is first disconnected from and then connected to the keyboard, the second controller of the keyboard performs handshake communication with the first controller of the tablet; and
   wherein the first controller is configured to recognize that the keyboard is connected to the tablet.

8. The terminal device according to claim 1, wherein the second controller of the keyboard is further configured to: determine that the second charging port is connected to the second external power supply; and control, when the tablet is connected to the keyboard and the first charging port of the tablet is not connected to the first external power supply, the charging switch to close, wherein the keyboard charges the battery of the tablet by using the second external power supply.

9. The terminal device according to claim 8, wherein the tablet is further configured to supply power to an external device connected to the tablet.

10. The terminal device according to claim 1, wherein the second end of the first switch and the second end of the second switch are also connected to a BUCK Charger.

11. A charging method for a terminal device, wherein the terminal device comprises: a tablet and a keyboard, wherein the tablet comprises: a first controller, a first charging port, and a battery;
    wherein:
       the keyboard comprises: a second controller and a second charging port;
       the first controller communicates with the second controller through data lines in a 3pin of the keyboard and a 3pin of the tablet; and
       the keyboard comprises a storage portion of a stylus, a buckboost circuit and a wireless charging chip integrated circuit (IC), wherein an input end of the buckboost circuit is configured to connect to a power supply pin of the second charging port, and an output end of the buckboost circuit is connected to an input end of the wireless charging integrated circuit (IC) which is used for charging the stylus; and the charging method comprises:

when the first charging port of the tablet is connected to a first external power supply, and the second charging port of the keyboard is connected to a second external power supply, comparing a charging power of the first charging port with a charging power of the second charging port;

in a case that the charging power of the first charging port is greater than the charging power of the second charging port, selecting the first charging port to charge the tablet and supplying power to the keyboard through a power line in the 3pin of the keyboard;

in a case that the charging power of the first charging port is less than the charging power of the second charging port, selecting the second charging port to supply power to the keyboard and charging the tablet through a power line in the 3pin of the tablet; and when the stylus is stored in the storage portion and the keyboard is not connected to the tablet, charging the stylus by the keyboard wirelessly by using the second external power supply.

12. The charging method according to claim 11, wherein:

when the second charging port of the keyboard is connected to the second external power supply and the keyboard is not connected to the tablet, neither the power line in the 3pin of the keyboard nor the power line in the 3pin of the tablet is electrified.

13. The charging method according to claim 12, further comprising:

after the second controller determines that the keyboard is connected to the tablet, and receives a power supply instruction sent by the first controller, controlling the power line in the 3pin of the keyboard by the second controller to output a voltage.

14. The charging method according to claim 12, further comprising:

when the keyboard is connected to the tablet, and the second charging port of the keyboard is unplugged from the second external power supply, supplying power to the keyboard by the tablet continuously.

15. The charging method according to claim 11, further comprising:

when the second charging port of the keyboard is connected to the second external power supply, and the tablet is first disconnected from and then connected to the keyboard, performing handshake communication with the first controller of the tablet by the second controller of the keyboard; and recognizing that the keyboard is connected to the tablet by the first controller.

16. The charging method according to claim 11, further comprising:

determining, by the second controller of the keyboard, the second charging port is connected to the second external power supply;

controlling, by the second controller of the keyboard, a charging switch to close when the tablet is connected to the keyboard and the first charging port of the tablet is not connected to the first external power supply; and charging, by the keyboard, the battery of the tablet by using the second external power supply.

17. The charging method according to claim 16, further comprising:

supplying, by the tablet, power to an external device connected to the tablet.

18. The charging method according to claim 11, wherein the tablet further comprises: a switch cap (SC) Charger, a first switch, and a second switch, wherein a first end of the first switch is connected to the first charging port and a second end of the first switch is connected to the SC Charger, a first end of the second switch is connected to the power line in the 3pin of the tablet and a second end of the second switch is connected to the SC Charger;

the tablet further comprises: a low-dropout linear regulator and a diode, wherein a power output end of the low-dropout linear regulator is connected to an anode of the diode, and a cathode of the diode is connected to the power line in the 3pin of the tablet; and an input end of the low-dropout linear regulator is connected to a system power supply of the tablet; and the keyboard further comprises a charging switch; wherein a first end of the charging switch is connected to the power supply pin of the second charging port of the keyboard; a second end of the charging switch is connected to the power line in the 3pin of the keyboard.

19. The charging method according to claim 18, wherein the low-dropout linear regulator comprises an enabling pin; and the method further comprises:

when receiving power failure information sent by the second controller, sending an enabling signal to the enabling pin by the first controller, and outputting a voltage by the power output end of the low-dropout linear regulator.

20. The charging method according to claim 11, further comprising:

supplying power to an external device connected to the tablet.

* * * * *